United States Patent Office 3,130,006
Patented Apr. 21, 1964

3,130,006
DECATIONIZED MOLECULAR SIEVE
COMPOSITIONS
Jule A. Rabo, Buffalo, Paul E. Pickert, North Tonawanda, and James E. Boyle, Buffalo, N.Y., assignors to Union Carbide Corporation, a corporation of New York
No Drawing. Filed Dec. 30, 1959, Ser. No. 862,764
18 Claims. (Cl. 23—110)

This invention relates to novel compositions of matter of the molecular sieve type. More particularly, this invention relates to decationized crystalline zeolitic aluminosilicates of the molecular sieve type and to methods for their preparation.

Zeolitic molecular sieves are crystalline metal aluminosilicates having a highly ordered arrangement of $AlO_4$ and $SiO_4$ tetrahedra which are interconnected through shared oxygen atoms. The spaces between the tetrahedra are occupied by water molecules prior to dehydration. Dehydration results in crystals interlaced with channels of molecular dimensions. These offer very large surface areas for the adsorption of foreign molecules provided the crystal structure remains intact so that the openings into the internal adsorption areas are retained.

The electrovalence of the aluminum in the structure is balanced by the inclusion of a cation in the crystal. In synthetic zeolitic molecular sieves the cation is most commonly an alkali metal such as sodium and potassium or mixtures thereof. The cations of either the synthetic or naturally occurring zeolites can be exchanged for other mono-, di- or trivalent cations which are of a suitable physical size and configuration to diffuse into the intracrystalline passages in the aluminosilicate structure.

The substitution of the original cations of the aluminosilicate with hydrogen cations by acid or water leaching has been heretofore known in the art. In addition, the introduction of hydrogen cations as substitutes for the metal cations has also been accomplished heretofore by ion-exchanging the metallic cations with ammonium cations and thereafter thermally treating the ammonium-exchanged form to liberate ammonia gas.

In these instances, however, the original metallic cation was either replaced by another metallic cation or by a hydrogen cation. Heretofore, it was thought that the aluminosilicate framework of the crystalline zeolitic molecular sieves was inherently unstable, i.e., its crystalline and essential structure would be destroyed, unless the aluminum atoms in that framework were stabilized by the presence of a stable cation. Hence, heretofore all efforts to produce large pore decationized molecular sieves having their essential crystalline structure unimpaired, have met with failure.

It is an object, therefore, of our invention to provide a novel decationized zeolitic molecular sieve having its essential crystalline structure unimpaired.

Another object of our subject invention is to provide a method of making the novel decationized zeolites of the invention.

Other objects will be apparent from the subsequent disclosure and appended claims.

The process by which the novel materials of this invention are produced may be called "decationization." The decationized molecular sieve aluminosilicates produced thereby, having at least some of their aluminum atoms unbalanced by cationic substituents and yet having unimpaired crystalline configuration have, in addition to the adsorbent properties of all molecular sieves, further use as hydrocarbon conversion catalysts. Among the hydrocarbon converting processes which may be catalyzed by the novel compositions of this invention are cracking or hydrocracking processes. In addition, the novel compositions of this invention will act as "supports" for other hydrocarbon conversion catalysts, as disclosed in our co-pending application Serial No. 862,989, filed concurrently herewith, the description thereof being incorporated herein by reference.

According to this invention, a novel decationized aluminosilicate molecular sieve comprises a crystalline structure, a $SiO_2/Al_2O_3$ ratio of greater than about 3.0, a pore size sufficient to adsorb benzene and a metal-cation-to-aluminum atomic ratio of less than about 0.9. In this regard, the criticality of the $SiO_2/Al_2O_3$ ratio can be seen from the fact that zeolite "X," disclosed in U.S. Patent 2,882,244, with a silica-to-alumina ratio of 2.5±0.5 collapses to an amorphous material and loses its internal pore system and practically all of its X-ray identification when subjected to substantial decationization.

The novel compositions of our invention may be prepared by ion-exchanging a substantial portion of the metal cations of a crystalline zeolitic metal aluminosilicate having a $SiO_2/Al_2O_3$ ratio of greater than about 3.0, with protons or more preferably with ammonium cations, followed by thermal treatment at temperatures of between 350° C. and 600° C., and preferably at temperatures of between 475° C. and 600° C.

It should be noted that, in order to effect structural rearrangement of hydrocarbon molecules, particularly at high temperatures, it is essential that the novel decationized sieves of this invention possess pore sizes sufficient to adsorb the hydrocarbon molecules and desorb the rearranged hydrocarbon molecules.

Therefore, exemplary of the zeolites that may employed in the practice of this invention are large pore size naturally occuring zeolites such as faujasite and large pore size synthetic zeolites which shall be hereinafter referred to as "Y" and "L."

The chemical formula for zeolite "Y" expressed in terms of mole oxides may be written as:

$$0.9 \pm 0.2\ Na_2O:Al_2O_3 : w\ SiO_2 : x\ H_2O$$

wherein "$w$" is a value greater than 3 up to about 6 and "$x$" may be a value up to about 9.

Zeolite Y has a characteristic X-ray powder diffraction pattern which may be employed to identify zeolite Y. The X-ray powder diffraction data are shown in Table A. The values for the interplanar spacing, $d$, are expressed in Angstrom units. The relative intensity of the lines of the X-ray powder diffraction pattern are expressed as VS, very strong; S, strong; M, medium; W, weak; and VW, very weak.

TABLE A

| hkl | $h^2+k^2+l^2$ | d in A. | Intensity |
| --- | --- | --- | --- |
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–4.79 | M |
| 440 | 32 | 4.37–4.46 | M |
| 620 | 40 | 3.90–3.93 | W |
| 533 | 43 | 3.77–3.79 | S |
| 444 | 48 | 3.57–3.59 | VW |
| 551, 711 | 51 | 3.46–3.48 | VW |
| 642 | 56 | 3.30–3.33 | S |
| 553; 731 | 59 | 3.22–3.24 | W |
| 733 | 67 | 3.02–3.04 | M |
| 660, 822 | 72 | 2.90–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 941 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.95 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.76 | W |
| 997; 11, 9, 3 | 211 | 1.70–1.71 | W |

When an aqueous colloidal silica sol is employed as the major source of silica, zeolite Y may be prepared by preparing an aqueous sodium aluminosilicate mixture having a composition, expressed in terms of oxide-mole-ratios, which falls within one of the ranges shown in Table B.

TABLE B

|  | Range 1 | Range 2 | Range 3 |
| --- | --- | --- | --- |
| $Na_2O/SiO_2$ | 0.20 to 0.40 | 0.41 to 0.60 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature in the range of from about 20° C. to 125° C. until crystals are formed, and separating the crystals from the mother liquor.

When sodium silicate is employed as the major sources of silica, zeolite Y may be prepared by preparing an aqueous sodium aluminosilicate mixture having a composition, expressed in terms of oxide-mole ratios, falling within any one of the ranges shown in Table C.

TABLE C

|  | Range 1 | Range 2 | Range 3 |
| --- | --- | --- | --- |
| $Na_2O/SiO_2$ | 0.6 to 1.0 | 1.5 to 1.7 | 1.9 to 2.1 |
| $SiO_2/Al_2O_3$ | 8 to 30 | 16 to 30 | about 10 |
| $H_2O/Na_2O$ | 12 to 90 | 20 to 90 | 40 to 90 |

The crystallization is conducted by holding the reaction mixture in the temperature range of 20° C. to 125° C. until the crystalline product is obtained. In this range it is preferred to use temperatures from 80° C. to 125° C.

Zeolite Y is more completely described in copending application Serial No. 109,487, filed May 12, 1961, in the name of D. W. Breck.

The composition of zeolite L may be stoichiometrically expressed in terms of mole ratios of oxides. Thus, a general formula for zeolite L may be represented as follows:

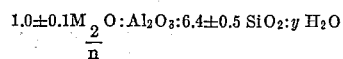

wherein "M" designates at least one exchangeable cation, as hereinbelow defined; "n" represents the valence of "M"; and "y" may be any value from 0 to about 7. Minor variations in the mole ratios of these oxides within the ranges indicated by the above formula do not significantly change the crystal structure or physical properties of the zeolite. Likewise, the value of "y" is not necessarily an invariant for all samples of zeolite L. This is true because various exchangeable cations are of different size, and as no appreciable modification of the crystal lattice dimensions of the zeolite is effected by the exchange of these particular cations, more or less interstitial space should be available for the accommodation of water molecule. The value if "y" therefore depends upon the identity of the exchangeable cation and also upon the degree of dehydration of the zeolite.

The exchangeable cations include mono-, di- and trivalent metal ions, particularly those of groups I, II and III of the periodic table, as set forth in Webster's New Collegiate Dictionary, 1956 edition, page 626, such as barium, calcium, cerium, lithium, magnesium, potassium, sodium, zinc ions etc. and the like, and other cations, for example, hydrogen and ammonium ions, which with zeolite L behave like the metal cations mentioned above in that they may be replaced for other exchangeable cations without causing a substantial alteration of the basic crystal structure of the zeolite. Of the exchangeable cations, mono- and divalent cations are especially satisfactory since they ordinarily may more easily be included within the cavities of the zeolite crystal.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

For best results, the crystallization procedure is carried out at a temperature of approximately 100° C. The zeolite may, however, be satisfactorily prepared at temperatures of from about 100° C. to about 120° C., the pressure being atmospheric or at least that corresponding to the vapor pressure of water in equilibrium with the mixture of reactants at the higher temperature.

In addition to composition, zeolite L may be identified and distinguished from other zeolites and other crystalline substances by its X-ray powder diffraction pattern, the data for which are set forth below in Tables E and F. In obtaining the X-ray powder diffraction patterns standard techniques were employed. The radiation was the K-alpha doublet of copper, and a Geiger counter spectrometer with a strip chart pen recorder was used. The peak heights, I, and the positions as a function of $2\theta$ where $\theta$ is the Bragg angle, were read from the spectrometer chart. From these, the relative intensities, $100 \, I/I_0$, where $I_0$ is the intensity of the strongest line or peak, and $d(\text{Å})$ observed, the interplanar spacing in Angstrom units, corresponding to the recorded lines were determined.

X-ray powder diffraction data for samples of the potassium form of zeolite L prepared from a potassium alumino-silicate reaction mixture ($K_2L$) and from a potassium-sodium aluminosilicate mixture (K—NaL) are given below in Table D. Also included in Table D are X-ray data for isomorphic forms of zeolite L in which varying proportions of the exchangeable cations originally present in the zeolite had been replaced by other exchangeable cations, viz., a 73 percent barium exchanged zeolite L(BaL), a 71 percent calcium exchanged zeolite L(CaL), a 28 percent cerium exchanged zeolite L($Ce_2L_3$), a 39 percent magnesium exchanged zeolite L(MgL), a 41 percent sodium exchanged zeolite L($Na_2L$), a 48 percent strontium exchanged zeolite L(SrL) and a 22 percent zinc exchanged zeolite L(ZnL).

TABLE D

| $2\theta$ | $d$ (A) | 100 $I/I_0$ | | | | | | | | |
|---|---|---|---|---|---|---|---|---|---|---|
| | | $K_2L$ | K-NaL | BaL | CaL | $Ce_2L_3$ | MgL | $Na_2L$ | SrL | ZnL |
| 5.6 | 15.8 | 100 | 100 | 100 | 100 | 100 | 100 | 100 | 100 | 100 |
| 11.2 | 7.89 | 14 | 6 | 38 | 10 | 38 | 12 | 9 | 12 | 14 |
| 11.8 | 7.49 | 15 | 14 | 62 | 31 | 94 | 24 | 25 | 41 | 32 |
| 14.8 | 5.98 | 25 | 16 | 56 | 33 | 94 | 29 | 21 | 44 | 38 |
| 15.4 | 5.75 | 11 | 6 | 31 | 18 | ------ | 16 | 14 | 12 | 32 |
| 19.4 | 4.57 | 32 | 30 | 69 | 37 | 75 | 33 | 34 | 32 | 65 |
| 20.2 | 4.39 | 13 | 13 | 38 | 16 | 63 | 12 | 13 | 32 | 18 |
| 20.5 | 4.33 | 13 | 19 | 38 | 29 | 69 | 22 | 23 | 50 | 35 |
| 22.7 | 3.91 | 30 | 35 | 56 | 33 | 81 | 39 | 34 | 63 | 47 |
| 23.4 | 3.78 | 13 | 13 | 13 | 12 | 38 | 14 | 13 | 16 | 18 |
| 24.3 | 3.66 | 19 | 18 | 50 | 22 | 56 | 20 | 16 | 32 | 29 |
| 25.6 | 3.48 | 23 | 21 | 62 | 22 | 50 | 24 | 25 | 41 | 38 |
| 27.3 | 3.26 | 14 | 23 | 25 | 22 | 25 | 20 | 21 | 28 | 38 |
| 28.1 | 3.17 | 34 | 48 | 100 | 47 | 88 | 51 | 46 | 56 | 56 |
| 29.1 | 3.07 | 22 | 27 | 59 | 22 | 63 | 29 | 29 | 41 | 38 |
| 29.6 | 3.02 | 15 | 14 | 38 | 10 | 25 | 12 | 11 | 31 | 12 |
| 30.7 | 2.91 | 23 | 27 | 62 | 31 | 81 | 29 | 29 | 56 | 44 |
| 33.8 | 2.65 | 19 | 18 | 44 | 16 | 69 | 22 | 21 | 31 | 32 |
| 34.2 | 2.62 | 8 | 16 | 31 | 8 | 38 | 14 | 11 | 12 | 12 |
| 35.5 | 2.53 | 8 | 6 | 25 | 4 | 38 | 6 | 5 | 12 | 6 |
| 36.6 | 2.45 | 9 | 10 | 19 | 6 | 44 | 6 | 9 | 22 | 12 |
| 37.1 | 2.42 | 11 | 10 | 25 | 4 | 25 | 10 | 7 | 22 | 9 |
| 41.2 | 2.19 | 11 | 10 | ------ | 10 | 56 | 12 | 11 | 28 | 12 |

The positions and relative intensities of the X-ray lines are only slightly different for the various cation forms of zeolite L. The patterns show substantially all of the same lines, and all meet the requirements of a unit cell of approximately the same size. The spatial arrangement of silicon, oxygen, and aluminum atoms, i.e., the arrangement of the $AlO_4$ and $SiO_4$ tetrahedra, are essentially identical in all forms of zeolite L. The appearance of a few minor X-ray lines and the disappearance of others from one cation form of zeolite L to another, as well as slight changes in positions and intensities of some of the X-ray lines, may be attributed to the different sizes and numbers of exchangeable cations present in the various forms of the zeolite.

The more significant $d$ (A.) values, i.e., interplanar spacings, for zeolite L are given below in Table E.

TABLE E 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

For the purposes of our invention, the removal of the zeolitic cations and the replacement thereof by hydrogen cations via the method of water leaching is not preferred since the removal of more than 30 percent of the zeolitic cations by this method is not possible. It is within the scope of this invention, however, to employ leaching with water to remove some of the zeolitic cations followed thereafter by additional decationization by other methods.

For the purposes of our invention, the replacement of the metallic cations of the zeolitic molecular sieve with hydrogen ions (protons or hydronium ions), prior to decationization by thermal treatment, by ion exchange with aqueous acids is also not a preferred method. This is because the molecular sieve zeolites are less stable in strongly acid mediums than in neutral or basic media.

In this regard, it should be noted that aqueous slurries of the alkali metal cation forms of molecular sieves are generally basic, i.e., they have a pH of between 10 and 12. Following the above indicated procedure, when these slurries are treated with acids to obtain hydrogen cation-exchange the method may be compared to the titration of a base with an acid. As the titration proceeds, however, in the instant application of an acid to a zeolite, a buffered region results in the titration curve where the consumption of the hydrogen cation of the acid through ion-exchange with the zeolite cation is not complete. As a consequence thereof, the excess acid attacks the zeolite framework with the dissolution of the alumina, i.e., there is a subsequent loss in essential zeolite crystallinity. In the buffered region of the titration curve the addition of acid does not appreciably change the pH of the slurry. With the type "X" zeolite of U.S. Patent 2,882,244 the buffering occurs at a pH of 3.5–4 and with the type Y zeolite at a pH of 2.5–3.0. Therefore, these pH values set a limit to the type and amount of mineral acid that can be used for this type of ion-exchange.

Generally, any easily ionizable acid can be used providing the quantity used does not lower the pH to these values. Acids that have been used for this purpose include hydrochloric (representative of the strong mineral acids) and acetic acid (representative of the very weak acids).

Ammonium-ion exchange of the molecular sieve to effect the novel compositions of this invention is preferred. Such exchange can be effected by a batchwise type ion exchange wherein the molecular sieve is slurried in an aqueous ammonium salt solution and the ion exchange equilibrium established. In addition the exchange can be effected by a continuous technique wherein a solution of ammonium cation is passed over a column of the zeolite such that the effluent containing the formed salt is continuously removed. As a consequence thereof, the ion exchange equilibrium is continuously upset.

The second method is favored for high percent exchanges. For example, in a 85–100 percent removal of the zeolite cation by ion exchange, a heated, continuous exchange technique is desirable. It is usually necessary to have repeated batchwise ion exchanges in order to remove the additional zeolite cations. However, the efficiency of the exchange decreases as the number of batchwise exchanges increases and approaches a limit at about 90 percent exchange. Batchwise ion exchanges at elevated temperatures of about 80 to 100° C. are more efficient than similar exchanges at room temperature for the higher degrees, i.e., over 50 percent, of ion exchange.

Any soluble ammonium salts can be used to effect the ion exchange of the zeolitic cation providing the resulting salt formed during the ion exchange is soluble. If the formed salt is insoluble it may be precipitated within the pores of the zeolite. This would be very difficult to remove by washing. Since most common ammonium salts are water soluble, this limitation is concerned primarily with the zeolitic cation to be exchanged, i.e., a silver-exchanged zeolite exchanged with ammonium chloride solution would result in the formation of insoluble AgCl. In this case a solution of ammonium nitrate would be preferred since $NH_4NO_3$ is soluble in $H_2O$, the preferred exchanging medium. It is to be understood, moreover, that quaternary ammonium cations, as exemplified by tetramethylammonium ions, can also be employed in the practice of our invention.

Since molecular sieve zeolites are synthesized in the alkali metal cation form, most of the ammonium ion exchanges will be effected with these cations. However, ammonium ion exchange with other cation-containing zeolites is possible, within the previously mentioned definitive limits. In this regard, a 90 percent calcium ion-exchanged type Y zeolite may also be ammonium ion-exchanged.

It may be desirable at times to acid wash, within the limitations of this process, zeolites prior to the ammonium ion exchange to effect a certain degree of hydrogen cation exchange. More significantly, this may be done to also effect the removal of difficultly removable impurities in the zeolite such as sodium silicate, sodium aluminate or sodium hydroxide remaining from the synthesis of the zeolite. Hence, this procedure serves as a prepurification process.

As aforementioned, the crystallinity of zeolitic molecular sieves may be demonstrated by characteristic X-ray diffraction patterns. However, molecular sieves are also recognizable by their adsorption characteristics. These characteristics include the type of adsorption, as shown by the shape of the adsorption isotherm, and pore size uniformity. The latter is measurable through selectivity measurements with molecules having critically-sized cross sections.

Similarly, the novel crystalline decationized zeolitic aluminosilicates of this invention may also be identified by their molecular sieve adsorptive properties. In this regard, the pore size of the decationized zeolitic molecular sieves of this invention is sufficient to adsorb benzene. Moreover, the sieves are also recognizable by their aluminosilicate framework wherein silica and alumina are in a ratio greater than about 3.0. Finally, they may also be identified by the characteristic X-ray diffraction pattern of the particular cationic zeolitic molecular sieve employed before decationization, as well as by other means showing their decationized structure.

Cation exchange of the sodium ions of the molecular sieve zeolites will usually result in a slight change in the peak-heights (intensity) of the X-ray diffraction pattern relative to the original sodium form. However, no new peaks will be formed and all of the major peaks will be retained, thereby indicating no change in the basic crystalline structure of the zeolite. In this connection, synthetic sodium zeolite "Y," Na(100)Y, was thoroughly cation exchanged to silver zeolite Y, Ag(100)Y, which was then thoroughly cation exchanged to ammonium zeolite Y, $NH_4(100)Y$. Samples from each were submitted for X-ray identification. The results are tabulated below:

TABLE F

| Zeolite Form | Sum of 10 Similarly Spaced Major Peak-Heights | Sum of 10 Similarly Spaced Minor Peak-Heights |
| --- | --- | --- |
| Na(100)Y | 348 | 75 |
| Ag(100)Y | 125 | 33 |
| $NH_4(100)Y$ | 369 | 70 |

The terms "decationized" or "decationization" are arbitrarily selected to characterize the novel zeolitic catalysts of this invention and the process for their preparation. As indicated heretofore, the decationization of the ammonium or hydrogen cation exchanged molecular sieve zeolites of this invention is generally accomplished by thermally heating the zeolite to temperature of between about 350° C. and about 600° C.

While the exact mechanism of the decationization process is not fully understood, the following equations showing the dacationization of an ammonium cation exchanged zeolitic molecular sieve can be taken as illustrative:

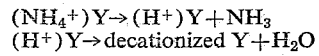

$$(NH_4^+)Y \rightarrow (H^+)Y + NH_3$$
$$(H^+)Y \rightarrow \text{decationized } Y + H_2O$$

It is noted that water is evolved in the second equation of the decationization process. This water is believed to be constituted of hydrogen from the cation sites and an equivalent amount of oxygen released from the aluminosilicate framework. That the crystal framework does not collapse when this oxygen atom is removed is surprising. It is believed that this stability is attributable to the silica to alumina ratio of greater than 3. This is substantiated by the fact that such a ratio has been found to be essential in the formation of the novel compositions of this invention.

It has also been found that, upon rehydration, cations can be reintroduced to a substantial extent. This indicates the presence of cation receptive sites in the decationized structure. These cation receptive sites are the result of the unpaired electrons remaining in the aluminum oxide tetrahedra as a result of the decationization steps.

The removal of the ammonia is facilitated by carrying out the heating in an oxygen-containing atmosphere, such as air, while vacuum pressures serve to assist in removing the water. The temperature employed in the removal of ammonia is critical, i.e., it must be in the range of 350° C. to 600° C., and preferably in the range of 475° C. to 600° C. When the decationized zeolitic molecular sieve is to be employed in hydrocarbon conversion processes, it is permissible to carry out the thermal treatment in situ after the metal cations of the zeolitic molecular sieve have been exchanged for the decomposable ammonium or hydrogen cations.

Therefore, it is to be clearly understood from the foregoing, that the term "decationized" relates to that unique condition whereby a substantial amount, i.e., at least 10 percent of the aluminum atoms of the aluminosilicate structure are not associated with cations. Another way of expressing "decationization" is that condition whereby less than about 90 percent of the aluminum atoms of a metal aluminosilicate zeolitic molecular sieve are associated with cations.

For best catalytic results, the degree of decationization should be at least 30 to 40 percent and preferably higher. It is to be observed that at about the preferred degrees of decationization of our catalyst, a zeolite "X" molecular sieve, as disclosed in U.S. Patent No. 2,882,244, loses its crystallinity. By contrast, a decationized zeolite "Y" of our invention will retain its crystallinity even when fully, i.e., 100 percent decationized.

To indicate this, a series of large pore-size zeolites which had been ammonium cation exchanged in varying amounts were heated. Thereafter, after exposure to atmospheric air, they were subjected to X-ray examination. The exposure to moist air allowed uncontrolled rehydration to occur. The intensities of the X-ray lines were, in general, diminished only slightly except in the sample employing zeolite X which has a silica to alumina ratio of about 2.5. The results of these tests are presented in Table G wherein the degree of ammonium cation-exchange is shown in parenthesis in the zeolite formulas. The results are shown as a percentage of the sum total retention of the peak heights of the 10 major lines.

TABLE G

*Effect of Thermal Decomposition Conditions on the Retention of X-Ray Diffraction Pattern Peak-Heights of Decationized Zeolite*

| Firing Conditions | Percent Retention of Peak-Heights | | | | |
|---|---|---|---|---|---|
| | $NH_4(80)X$ | $NH_4(20)Y$ | $NH_4(40)Y$ | $NH_4(60)Y$ | $NH_4(80)Y$ |
| None | 100 | 100 | 100 | 100 | 100 |
| In air to 350° C | [1]20 | 90 | 80 | 70 | 55 |
| In vacuum to 350° C | | 90 | 80 | 70 | 55 |
| In air to 350° C., rehydrated and heated again in air to 350° C | [1]0 | 90 | 75 | 35 | [1],[2]55 |
| In air to 600° C | | 80 | 80 | 60 | 30 |
| In vacuum to 600° C | 10 | 100 | 85 | 80 | 60 |

[1] Platinum-loaded (½ wt.-percent).
[2] Heated to 500° C. instead of 350° C. for each activation.

As indicated previously, the materials of this invention can also be rehydrated and reactivated without loss of the essential molecular sieving characteristics of the material. Repeated adsorption-desorption of hydrocarbon and other non-polar molecules on decationized materials does not alter the adsorption characteristics of the materials. This is because the crystallinity of the decationized molecules is not destroyed. In this regard, if all or even a portion of the zeolitic crystallinity were destroyed, a certain amount of the pores, relative to the degree of destruction, would be opened or closed with a subsequent reduction in the molecular sieving effect. The adsorption of the critical size molecule on the amorphous portion formed during destruction would, therefore, result in a subsequent increase in the adsorption capacity and the destruction of the adsorption characteristics of the materials.

The results of such "plug-gauging" type adsorptions on decationized Types X and Y molecular sieve zeolites are presented in Table H.

TABLE H

*Adsorption of Critical Size Molecules on Decationized Molecular Sieve Zeolites at 25° C.*

| Pressure | 20 mm. Hg | 0.075 mm.Hg | 0.075 mm. Hg |
|---|---|---|---|
| Adsorbate | Perfluoro $C_8$ Cyclic Ether | Tri-n-Butylamine | Perfluoro-Tri-n-Butylamine |
| | Adsorption Capacities [a] | | |
| Material | Critical Dimension≅ 7.5 A | Critical Dimension≅ 9.1 A. | Critical Dimension≅ 11.5 A. |
| NaY Standard [b] | 41.7 | 19.1 | 3.9 |
| $NH_4(20)Na(80)Y$ [b] | 42.4 | 18.5 | 4.3 |
| $NH_4(65)Na(35)Y$ [b] | 42.3 | 4.2 | 1.2 |
| $NH_4(80)Na(20)Y$ [b] | 39.7 | 3.3 | 2.9 |
| $NH_4(80)Na(20)Y$—original activation at 500° C., rehydrated and reactivated at 350° C | 26.3 | 3.6 | 2.2 |
| $NH_4(80)Na(20)Y$—original activation at 350° C., rehydrated and reactivated at 350° C | 25.2 | 3.2 | 2.1 |
| $NH_4(80)Na(20)X$—original activation at 500° C., rehydrated and reactivated at 350° C | 17.0 | 6.3 | 12.7 |
| $NH_4(80)Na(20)X$—original activation at 350° C., rehydrated and reactivated at 350° C | 25.4 | 10.0 | 20.9 |

[a] G. adsorbate/g. activated adsorbent × 100.
[b] Activated at 350° C. in vacuum.

All the materials tested regardless of the degree of ammonium exchange or decationization adsorbed a substantial quantity of the perfluoro $C_8$ cyclic ether. Adsorption of tri-n-butylamine on these same materials indicated that products from ammonium ion exchanges greater than 20 percent had an apparent decrease in pore size. None of the products adsorbed the large perfluoronated tri-n-butylamine illustrating the unique uniform pore size of these materials after such an activation.

With the 80 percent ammonium cation-exchanged type X zeolite, heating at either 350° C. or 500° C. followed by saturation with water and reheating showed a decrease in the molecular sieving effect (amorphous material formation) in that both the tri-n-butylamine and the perfluoro-tri-n-butylamine were adsorbed. Similarly, the adsorption capacities of these two materials for the perfluoro $C_8$ cyclic ether was reduced to approximately 50 percent of the value of the materials before rehydration. A similar decrease in adsorption capacity for normal hexane, a smaller molecule, was also found.

With a similarly decationized type Y molecular sieve zeolite, treated in the same manner as that described for the type X zeolite, a loss in the adsorption capacity for the perfluoro $C_8$ cyclic ether equivalent to the decrease in the n-hexane adsorption capacity was observed. However, regardless of the decationization temperature, this material did not adsorb the larger size adsorbates. These results demonstrate that the decationized materials still have a uniform pore size characteristic of a crystalline molecular sieve zeolite.

The following examples will serve to illustrate the practice of this invention:

EXAMPLE I (a) Two hundred grams of a NaY molecular sieve zeolite having a $SiO_2:Al_2O_3$ ratio of 4.8 and containing 18 wt.-percent $H_2O$ was suspended with mechanical stirring in 400 ml. of distilled water. To this slurry was added portions of a 2.35 N aqueous hydrochloric acid solution. The pH was measured after each addition. The following values were obtained.

TABLE I

| Ml. of acid added | pH of slurry |
|---|---|
| 0 | 9.90 |
| 25 | 4.70 |
| 50 | 3.60 |
| 75 | 3.30 |
| 100 | 3.00 |
| 125 | 2.80 |
| 150 | 2.70 |
| 175 | 2.60 |
| 200 | 2.55 |

This corresponds to the addition of 0.470 equivalent of acid which is enough for 65% removal of the sodium if the exchange were quantitative. The exchanged zeolite was filtered with suction and washed with distilled water until the washings gave a negative test for Cl⁻ with silver nitrate reagent. The analysis of this material showed a 48% removal of the original sodium content. All zeolite crystallinity was retained as evidenced by X-ray patterns.

(b) To the same quantity of NaY zeolite used in Example I(a) there was added 100 ml. of 2.35 N HCl. The slurry pH was 3.1. This was enough acid theoretically for a 33% exchange of the sodium cation. Analyses showed a 30% ion exchange of the sodium had been achieved. All crystallinity was retained.

EXAMPLE II

Employing a procedure identical with Example I, a series of NaX molecular sieve zeolites were proton-exchanged and sodium re-ion exchanged. The purpose of these tests was to indicate that proton-exchanged zeolites may be re-ion exchanged with metal cations, such as sodium, providing the proton exchange was not extended to the point where the zeolite framework was attacked and alumina removed. The results of these tests are tabulated in the following Table J.

TABLE J

| pH to Which Titrated | Ml. of Acid Used (2.35 N) | Milli-equivalent of Acid Used | Theoretical Percent Exchange | Percent Exchange [1] Found | Percent Re-ion [1] Exchange | $SiO_2$/$Al_2O_3$ Molar Ratio | Percent Retention of Crystallinity (X-ray) | Surface Area B.E.T. | |
|---|---|---|---|---|---|---|---|---|---|
| | | | | | | | | After $H^+$ I.E. | After $Na^+$ Re-I.E. |
| 8 | 5.25 | 12.35 | 2 | 4 | 100 | 2.4 | 100 | 512 | 553 |
| 5 | 36.06 | 84.6 | 13 | 16 | 100 | 2.3 | 100 | 581 | 576 |
| 4 | 94 | 221 | 35 | 35 | 100 | 2.2 | 100 | 475 | 506 |
| 3.2 | 271 | 638 | 100 | 83 | 85 | 2.5 | 0 | 69 | 98 |
| 3.0 | 440 | 1,035 | [2] 160 | 81 | 83 | 2.8 | 0 | 25 | 52 |

Starting material, molar ratios:
$Na_2O$:$Al_2O_3$=0.97
$SiO_2$:$Al_2O_3$=2.3
[1] Determined as (percent Na found/percent Na on starting material)×100.
[2] 60% excess over theory.

EXAMPLE III.—AMMONIUM EXCHANGE OF TYPE Y MOLECULAR SIEVE ZEOLITE (BATCHWISE)

A series of various percent $NH_4^+$ exchanged type Y zeolites designed to determine the effect of the $NH_4^+$/$Na^+$ equivalents ratio were prepared. For each sample the same amount of type Y molecular sieve was used, i.e., 290 g. The sieve contained 20% $H_2O$. The necessary amount of $NH_4Cl$ was dissolved in enough distilled $H_2O$ (also considering the 60 ml. of $H_2O$ present on the zeolite) to produce a 1.0 molecular solution for each determination. To these stirred solutions there was charged the amount of zeolite indicated above. The resulting slurry was stirred for 0.5–20 hours, filtered with suction. The filter precipitate was washed free of chloride ion with fresh distilled water. The following data were collected:

TABLE K

| Preparation | | | Analyses | | |
|---|---|---|---|---|---|
| $NH_4^+$/$Na^+$ Equivalents Ratio | Grams $NH_4Cl$ | $H_2O$ Content Minus 60 Ml. | Percent $(NH_4)_2O$, Anhydrous Basis | Percent $Na_2O$, Anhydrous Basis | Percent Na Not Removed |
| 0.35 | 19 | 290 | 3.1 | 9.1 | 68 |
| 0.50 | 27 | 440 | 4.0 | 8.0 | 60 |
| 1.0 | 54 | 940 | 5.7 | 6.1 | 45 |
| 2.0 | 108 | 1,940 | 6.9 | 4.7 | 35 |
| 4.0 | 216 | 3,940 | 7.5 | 4.1 | 31 |

EXAMPLE IV.—BATCHWISE AMMONIUM EXCHANGE TYPE Y MOLECULAR SIEVE

Thirteen hundred twenty (1320) grams of a NaY molecular sieve zeolite having a $SiO_2$:$Al_2O_3$ ratio of 4.7 was suspended in 2 liters of distilled $H_2O$. To this stirred suspension was added a solution of 2140 g. (40 equivalents) of $NH_4Cl$ dissolved in 6 liters of distilled water that had been heated to boiling. The resulting suspension was stirred for 2 hours without additional heating and was then cooled to room temperature. The suspension was filtered with suction and the filter product washed with 3 liters of distilled $H_2O$. This process was repeated five times. The 5 times-exchanged material was washed free of chloride ion as were the small samples removed after each exchange, dried in an oven at 125° C. and then re-equilibrated with the $H_2O$ vapor in air. The following analyses were obtained after the third, fourth and fifth exchanges:

TABLE L

| | $Na_2O$ (Anhydrous Basis) | | $(NH_4)_2O$ (Anhydrous Basis) | |
|---|---|---|---|---|
| No. of Exchanges | Wt.-Percent Found | Percent of Original | Wt.-Percent Found | Percent of Exchange |
| 3 | 2.3 | 19 | 9.0 | 82 |
| 4 | 2.0 | 16 | 10.0 | 84 |
| 5 | 1.8 | 14 | 10.1 | 86 |

EXAMPLE V.—CONTINUOUS AMMONIUM EXCHANGE OF TYPE Y MOLECULAR SIEVE ZEOLITE

Two hundred eighty (280) grams of a type NaY molecular sieve zeolite was slurried in 1 liter of distilled water and formed into a filter precipitate in an 8″ diameter Buchner funnel. By applying a water aspirator vacuum (20 mm. of Hg pressure) a solution of 216 g. (4.0 moles) of ammonium chloride dissolved in 2 liters of distilled water was drawn through the precipitate. The cation-exchanged filter precipitate was washed free of $Cl^-$ ion and dried to a free-flowing powder ($H_2O \cong 32\%$). Analysis showed the material contained 2.5% $Na^+$ and 4.1% $NH_4^+$.

EXAMPLE VI.—CATION RECONSTITUTION OF DECATIONIZED SIEVE (a) A sample of an ammonion exchanged type Y molecular sieve zeolite was prepared by the continuous ion exchange technique. Analysis showed this material to contain 3.1% $Na_2O$ and 8.7% $(NH_4)_2O$ (i.e., 78% ion-exchanged). This sample was then heated in a stream of dry air to 510° C. for 6 hours, then rehydrated by exposing to air for 20 hours. Analysis of this material showed the following:

$Na_2O = 2.9 \pm 0.1\%$
LoI.($H_2O$) = $19.6 \pm 0.5\%$
$(NH_4)_2O$ = less than 0.2%

(b) Thirty-one and two-tenths (31.2) gram portions (25 g. anhydrous) of the product obtained in (a) above were re-ion exchanged by the passage of 0.432 equivalent of the salt solution indicated below dissolved in 400 ml. of distilled $H_2O$, over a filter precipitate of the zeolite sample in a continuous manner. The filter precipitates were formed by slurrying the zeolite in 200 ml. of distilled $H_2O$ and filtering with suction. The re-ion exchanged samples were washed with distilled $H_2O$ to remove soluble salts. The samples were thereupon dried in air (125° C.). Re-ion exchanges were attempted with the following materials with the indicated results.

TABLE M

| Re-Ion Exchanging Salt Solution | Analytical Results (Anhydrous Basis) |
|---|---|
| $NH_4Cl$ | $(NH_4)_2O$, 6.45%; $Na_2O$, 1.45%. |
| NaCl | $Na_2O$, 7.5%. |
| NaOH | $Na_2O$, 9.6%. |
| $AgNO_3$ | $(Ag_2O)$, 27.3%; $Na_2O$ =0.1%. |

Complete cation reconstitution was not achieved in these samples. However, it can be seen that a considerable portion of the cation capacity occupied by $NH_4^+$ ions before decomposition was still present. In the $NH_4Cl$ and $AgNO_3$ re-ion exchanges, additional $Na^+$ was removed. All of these products had satisfactory X-ray diffraction patterns.

EXAMPLE VII.—PREPARATION OF A COMPLETELY $NH_4^+$ EXCHANGED MOLECULAR SIEVE ZEOLITE

With a Y zeolite, a 100% exchange of the $Na^+$ ions was accomplished with an $Ag^+$ ion. The Ag(100%)Y zeolite was then cation exchanged with solutions of ammonium salts having anions that form an only slightly disassociated anionic complex with the $Ag^+$ cation, i.e., with a $CN^-$ ion which with $Ag^+$ forms $Ag(CN)_2^-$, and with a $SCN^-$ ion, with which $Ag(SCN)_2^-$ forms. Since the silver is in the anionic portion of such a complex it cannot be ion exchanged at the decationized alumina tetrahedra sites of the zeolites. The cationic portion of the complexing salt occupied the sites vacated by the $Ag^+$ cations.

EXAMPLE VIII.—$NH_4$ ION EXCHANGE OF A Ca(87) Na(13) TYPE Y MOLECULAR SIEVE ZEOLITE

A total of 330 g. (at 25% $H_2O$=247 g. anhydrous) of calcium exchanged type Y molecular sieve zeolite, that contained 1.7 wt.-percent $Na_2O$ and 11.3 wt.-percent CaO, was slurried in 1 liter of a solution of 550 g. (10 moles) of $NH_4Cl$ dissolved in 3 liters of distilled $H_2O$. This slurry was filtered with suction. The remaining 2 liters of the $NH_4Cl$ solution was thereupon passed through the filter precipitate. The filter precipitate was washed free of soluble salts, dried in an oven at 130° C. and left to re-equilibrate with the water vapor in the air (21%). Analyses of the material showed it contained 2.75 wt.-percent CaO (24.4% of that of the starting material), 1.3% $Na_2O$ (9% of that of the starting material) and 8.7 wt.-percent $(NH_4)_2O$ [74% of a complete $NH_4(100)Y$].

EXAMPLE IX.—DECOMPOSITION UNDER VACUUM

Weighed samples of various degrees of ammonium-exchanged type Y molecular sieve zeolites (approximately 20–30 g.) were placed in Pyrex glass tubes sealed at one end, and heated under a vacuum of 0.1–0.5 mm. of Hg. The amount of $NH_3$ gas liberated was collected in a trap containing water to which (from a modified buret) known amounts of standardized sulfuric acid solution could be added semicontinuously as the $NH_3$ was collected. Bromcresol purple was the visual acid-base indicator in this trap. From the amount of $H_2SO_4$ consumed, the amount of $NH_3$ liberated as the sample was heated to different temperatures, was calculated. The amount of water on the sample was calculated as the difference between the total weight loss and the amount of $NH_3$ liberated. From this value, the amount of starting material on an anhydrous basis was calculated. The following data were collected: each sample was decomposed under a vacuum of 0.1–0.5 mm. of Hg.

TABLE N

| $NH_4^+$ exchanged | 20% | 40% | 60% | 75% | 85% | 100% |
|---|---|---|---|---|---|---|
| | Percent $NH_3$ Recovered | | | | | |
| Temperature, ° C.: | | | | | | |
| 100–225 | 14 | 10 | 11 | 14 | 12 | 14 |
| 225–350 | 50 | 42 | 46 | 34 | 46 | 47 |
| 350–475 | 30 | 40 | 32 | 41 | 35 | 32 |
| 475–600 | 7 | 8 | 10 | 8 | 5 | 10 |

The above data showed that heating to a temperature of at least 350° C. is required to decompose a majority of the ammonium cations. A temperature of 475° C. gives about 90 percent decomposition while 600° C. effects substantially complete removal of the ammonia.

In this regard, analysis of a sample of a 550° C. heat-treated in dry air 75% $NH_4^+$ exchanged material showed the presence of 0.07 wt.-percent $N_2$ (by the Kjeldahl method) still on the sample. Reheating this material under vacuum caused the removal of an amount of $NH_3$ corresponding to this amount of $N_2$. A sample that had been heated to 350° C. to decompose 50–60% of the $NH_4^+$ and rehydrated was again reheated under vacuum. During the second heating, less than 10% additional $NH_3$ was removed at a temperature of 350° C. This showed that the thermal decationization is primarily dependent upon the temperature to which the sample is heated.

EXAMPLE X.—DECATIONIZATION OF $NH_4$ EXCHANGED TYPE Y ZEOLITES IN VARIOUS ATMOSPHERES

The effect of the atmosphere in which the decomposition of the $NH_4^+$ ion was effected was investigated. The same system as described in Example IX was employed except a flow of the desired gas was passed through the heated sample. The $NH_4(75)Y$ powder samples were pelletized to prevent the carry-off of the zeolite by the gas stream. The gases were dried by passing them through a drier of an activated type 4A molecular sieve. The heating was carried out to a temperature of 550° C. The following data was obtained:

TABLE O

| Run | Atmosphere | Milliequivalent of $NH_3$ Liberated per gram Anhydrous Starting Material | Crystalline Retention |
|---|---|---|---|
| A | vacuum | 3.26 | almost complete. |
| B | dry air-atm. press | 2.81 | Do. |
| C | do | 2.74 | Do. |
| D | dry $N_2$-atm. press | 3.26 | Do. |
| E | dry $H_2$-atm. press | 3.29 | Do. |

In the results shown above, the liberation of 3.26 to 3.29 milliequivalents of $NH_3$ is indicative of substantially complete ammonia removal and was checked by analysis of the product from the vacuum treatment. This indicated 0.06±0.003% $N_2$ remaining. The lower value of the ammonia trapped during the air treatment results from partial oxidation of the ammonia.

EXAMPLE XI.—ADSORPTION PROPERTIES

The utility of the decationized type Y molecular sieve zeolite was illustrated by its molecular sieving adsorption characteristics. The apparent pore size of the highly decationized material appeared to be somewhat lower than that of the cationic sodium form. The pore size of the type NaY appears to be 9–10 A. The pore size of the decationized type Y appears to be from 8–9 A. It was found that the decationized Y molecular sieve will adsorb molecules commensurate with its pore size.

EXAMPLE XII.—HYDROCRACKING ACTIVITY OF DECATIONIZED MOLECULAR SIEVE ZEOLITE

In addition to other utilities, the decationized zeolitic molecular sieves of this invention are particularly useful in hydrocarbon cracking processes. A decationized type Y zeolite was tested as a hydrocracking catalyst. It was found to possess superior hydrocracking activity in comparison with a commercial catalyst. The hydrocarbon feed used was n-heptane. Both materials were activated in $H_2$ prior to testing in the standard procedure. The decationization of the $NH_4^+Y$ illustrated an in situ activation of this material. The following results were obtained:

TABLE P

| Material | Decationized Na(20)Y | Commercial Catalyst | | |
|---|---|---|---|---|
| Reaction Temp., °C | 450 | 450 | 500 | 550 |
| Products Formed (Mole-Percent): | | | | |
| $C_1$–$C_4$ lights | 75 | 4 | 8 | 42 |
| Percent $C_1$+$C_2$ in $C_1$–$C_4$ | 3 | 0 | 10 | 12 |
| Percent $C_3$ in $C_1$–$C_4$ | 43 | 50 | 45 | 48 |
| Percent $C_4$ in $C_1$–$C_4$ | 54 | 50 | 45 | 40 |
| Percent iso $C_4$ in $C_4$ | 72 | 45 | 49 | 55 |
| Percent unreacted n-$C_7$ | 14 | 96 | 92 | 55 |

These results revealed that the decationized Y was more active than the commercial cracking catalyst at a 100° C. lower temperature. Furthermore, the product consisted of the more desirable propane and butane components. In the butane fraction, a large portion of the product was the desirable isobutane.

What is claimed is:

1. A decatonized aluminosilicate zeolitic molecular sieve having a crystalline structure, a silicon dioxide to aluminum trioxide molar ratio greater than about 3.0, a pore size sufficient to adsorb benzene, and a metal-cation-to-aluminum atomic ratio of less than about 0.9, less than 90 percent of the aluminum atoms being associated with cations.

2. A decationized aluminosilicate zeolitic molecular sieve having a crystalline structure, a silicon dioxide to aluminum trioxide molar ratio greater than about 4.5, a pore size sufficient to adsorb benzene, and a metal-cation-to-aluminum atomic ratio of less than about 0.7; less than 70 percent of the aluminum atoms being associated with cations.

3. A decationized aluminosilicate zeolitic molecular sieve having a crystalline structure, a silicon dioxide to aluminum trioxide molar ratio greater than about 4.5, a pore size sufficient to adsorb benzene, and a metal-cation-to-aluminum atomic ratio of less than about 0.3; less than 30 percent of the aluminum atoms being associated with cations.

4. A process for the preparation of a crystalline decationized zeolitic aluminosilicate, which comprises ion-exchanging a substantial portion of a metal aluminosilicate zeolite having a silicon dioxide to aluminum trioxide ratio of greater than about 3.0 and a pore size sufficient to adsorb benzene, with ammonium ions, followed by thermal treatment at temperatures of between 350° C. and 600° C.

5. A process as claimed in claim 4, in which the zeolite has an X-ray diffraction pattern according to Table A.

6. A process as claimed in claim 4, in which the thermal treatment is carried out at a temperature of between 475° C. and 600° C.

7. A process as claimed in claim 4, in which the metal of the metal aluminosilicate includes a member selected from the group consisting of sodium, calcium, and silver.

8. A metal aluminosilicate zeolite having an X-ray diffraction pattern according to Table A, said zeolite having a metal cation-to-aluminum atomic ratio of less than 0.9, a $SiO_2/Al_2O_3$ ratio greater than 3, and a pore size sufficient to adsorb benzene, and having less than 90% of the aluminum atoms of the zeolite associated with cations.

9. A metal aluminosilicate zeolite consisting of faujasite derivative, said zeolite having a metal cation-to-aluminum atomic ratio of less than 0.9, a $SiO_2/Al_2O_3$ ratio greater than 3, and a pore size sufficient to adsorb benzene, and having less than 90% of the aluminum atoms of the zeolite associated with cations.

10. A metal aluminosilicate zeolite having an X-ray diffraction pattern according to Table A, said zeolite having a metal cation-to-aluminum atomic ratio of less than 0.7, a $SiO_2/Al_2O_3$ ratio greater than 3, and a pore size sufficient to adsorb benzene, and having less than 70% of the aluminum atoms of the zeolite associated with cations.

11. A metal aluminosilicate zeolite consisting of faujasite derivative, said zeolite having a metal cation-to-aluminum ratio of less than 0.7, a $SiO_2/Al_2O_3$ ratio greater than 3, and a pore size sufficient to adsorb benzene, and having less than 70% of the aluminum atoms of the zeolite associated with cations.

12. A decationized aluminosilicate zeolitic molecular sieve having a crystalline structure, a silicon dioxide to aluminum trioxide molar ratio greater than about 3.0, a pore size sufficient to adsorb benzene, and a metal-cation-to-aluminum atomic ratio of less than about 0.7, less than 70 percent of the aluminum atoms being associated with cations.

13. An aluminosilicate, according to claim 8, in which less than five percent of the aluminum atoms are associated with cations.

14. A metal aluminosilicate zeolite having an X-ray diffraction pattern according to Table E, said zeolite having a metal cation-to-aluminum atomic ratio of less than 0.9, a $SiO_2/Al_2O_3$ ratio greater than 3, and a pore size sufficient to adsorb benzene, and having less than 90% of the aluminum atoms of the zeolite associated with cations.

15. A metal aluminosilicate zeolite having an X-ray diffraction pattern according to Table E, said zeolite having a metal cation-to-aluminum atomic ratio of less than 0.7, a $SiO_2/Al_2O_3$ ratio greater than 3, and a pore size sufficient to adsorb benzene, and having less than 70% of the aluminum atoms of the zeolite associated with cations.

16. A process for the preparation of a crystalline decationized zeolite aluminosilicate, which comprises hydrogen ion-exchanging a substantial portion of a crystalline metal aluminosilicate zeolite having a silicon dioxide to aluminum trioxide ratio of greater than about 3.0 and uniformly sized pores sufficiently large to adsorb benzene, and thereafter heating the hydrogen ion-exchanged crystalline zeolite to temperature between 350° C. and 600° C. to remove the hydrogen ions.

17. A process according to claim 16 in which said hydrogen ion-exchanging is by water leaching.

18. A process according to claim 16 in which said hydrogen ion-exchanging is by contact with aqueous acid.

References Cited in the file of this patent

UNITED STATES PATENTS

| 2,882,244 | Milton | Apr. 14, 1959 |
| 2,950,952 | Breck et al. | Aug. 30, 1960 |
| 2,971,904 | Gladrow et al. | Feb. 14, 1961 |

OTHER REFERENCES

Barrer et al.: "J. Chem. Soc.," pages 2892–2903.